United States Patent [19]

Isozaki et al.

[11] Patent Number: 5,469,313
[45] Date of Patent: Nov. 21, 1995

[54] SUPPORTING DEVICE FOR A MAGNETIC HEAD WHICH RECORDS/REPRODUCES INFORMATION FROM A MAGNETIC LAYER OF A PHOTOGRAPHIC FILM

[75] Inventors: Shin Isozaki; Shozo Kikugawa; Eiji Iwata, all of Hino, Japan

[73] Assignee: Konica Corporation, Japan

[21] Appl. No.: 191,875

[22] Filed: Feb. 4, 1994

[30] Foreign Application Priority Data

Feb. 9, 1993 [JP] Japan .................................. 5-021449
Feb. 9, 1993 [JP] Japan .................................. 5-021450

[51] Int. Cl.⁶ ...................... G11B 5/48; G11B 5/10; G03B 31/00; G03B 17/24
[52] U.S. Cl. .................... 360/104; 360/3; 360/129; 352/92; 354/106
[58] Field of Search ........................ 360/3, 104–106, 360/129; 352/37, 92, 236; 354/27, 76, 105, 106; 355/41

[56] References Cited

U.S. PATENT DOCUMENTS

| | | | |
|---|---|---|---|
| 3,909,120 | 9/1975 | Stella | 360/3 |
| 3,936,884 | 2/1976 | Hogan | 360/129 |
| 4,208,108 | 6/1980 | Amikura et al. | 360/3 |
| 4,965,627 | 10/1990 | Robison | 354/106 |
| 4,975,732 | 12/1990 | Robison et al. | 355/40 |
| 5,034,836 | 7/1991 | DeMarti, Jr. et al. | 360/104 |
| 5,041,933 | 8/1991 | DeMarti, Jr. et al. | 360/104 |
| 5,091,811 | 2/1992 | Chang | 360/2 |
| 5,155,511 | 10/1992 | Tamamura | 354/105 |
| 5,285,325 | 2/1994 | Kiesow | 360/3 |
| 5,353,078 | 10/1994 | Aoshima | 354/105 |

FOREIGN PATENT DOCUMENTS

| | | | |
|---|---|---|---|
| 0589270 | 3/1994 | European Pat. Off. | 360/3 |
| 4-229851 | 8/1992 | Japan | 360/3 |
| 5-150316 | 6/1993 | Japan | 354/105 |
| 5-158136 | 6/1993 | Japan | 354/105 |

*Primary Examiner*—Stuart S. Levy
*Assistant Examiner*—Jefferson Evans

[57] ABSTRACT

A supporting device to support a magnetic head in close proximity to a photographic film passage so that the track section of the magnetic head is brought in contact with a magnetic layer on the film, includes a supporting member, a fixing member on which the magnetic head is fixed, two supporting resilient arms one ends of which are fixed to the fixing member and the other ends are fixed to the supporting member. The two supporting arms are fixed in such manner that the two supporting arms are inclined relative to a surface of the fixing member and imaginary lines which are colinear with and extend from the two first supporting arms cross each other at an imaginary line which is colinear with and extends from a magnetic gap of the track section of the magnetic head.

11 Claims, 6 Drawing Sheets

SUPPORTING DEVICE FOR A MAGNETIC HEAD WHICH RECORDS/REPRODUCES INFORMATION FROM A MAGNETIC LAYER OF A PHOTOGRAPHIC FILM

BACKGROUND OF THE INVENTION

The present invention relates to a supporting device of magnetic heads for recording and reproducing information on a virtually transparent magnetic layer (referred to as a transparent magnetic layer, hereinafter) provided on a photographic film.

Recently, the performance of individual units composing a photographic system such as films, cameras and photo-finishing machines has been remarkably improved. However, photographic information can not be sufficiently exchanged between them. Therefore, it is difficult to further improve the performance and to reduce the costs and time. For example, according to the present color printing system, the camera conditions and the object informations are presumed from the optical data of a developed negative image, and then the printing condition is determined only on the basis of the presumed data. Under the above printing condition, printing operations are conducted so as to meet the requirements of average customers. Accordingly, the printed photographic images are in a average level, so the photographing conditions and the purpose of photographing are not fully reflected on the prints. For this reason, the performance of films and cameras can not be fully utilized. In order to meet the requirements of users, it is necessary to incorporate photographic information into printing operations.

However, the photo-finishing operation is conducted in a water solution and in a dark room, it is difficult to transfer information to photo-finisher from customer.

In the International Application Nos. WO-90/04205 and WO-90/04214, and U.S. Pat. Nos. 4965627 and 4975732, a means for easily exchanging information in a photographic system is disclosed, in which a transparent magnetic recording layer is coated all over the back surface of a film and necessary information is directly recorded on the film. That is, when a film is manufactured, a manufacturer's name, type of film, lot number of emulsion, sensitivity, date of manufacture, reference signal, and the like are recorded on the film. In the case of photographing, the following photographing conditions are recorded for each frame: color temperature of a light source, luminance level of an object, shutter speed, aperture size, backlight control, rapidfire mode, type of camera, photographer's ID, photographing date, and memo written by the photographer. Further, when the film is received by a photo finishing-laboratory, the following customer's orders are recorded on the film: a printing size, number of prints, and type of surface finish (silk-finish or luster-finish). In the printing operation, the recorded information is read out from the film, and the printing condition is determined based on this information together with the optical data obtained when the negative film is been scanned. In this way, the photographing conditions and photographing purpose can be fully reflected on the print. When these photographing conditions are recorded in each frame of the film and read out in the printer, a print of equal picture quality can always be obtainable. Since various information of photography can be directly recorded in each frame as described above, it is possible to automatically control the printing operation with a computer, so that the following advantages can be provided. They are a improvement in picture quality and reduction in cost and processing time. This system is characterized in that: since the photographic information is directly recorded on a film, the information completely corresponds to each frame; and when a signal modulation system insensitive to the fluctuation of the film transport speed is employed, these recorded information can be easily transferred.

In order to record photographic information, not only magnetic recording means but also electrical or optical means can be employed. The electrical means in which IC memories are used are disadvantageous in that the costs are high. The optical means in which bar code system are used are also disadvantageous in that the recording capacity is small and it is impossible to rewrite the information. For this reason, the magnetic recording method by which photographic information can be directly recorded on a film is most appropriate because the recording cost is low, the recording density is high, the recorded information can be arbitrarily rewritten, the photographic information completely corresponds to an image in each frame, and the photographic information can be easily transferred.

In general, conventional magnetic recording is conducted in the following manner: a signal current is made to flow in a coil of a magnetic head (referred to as a head, hereinafter); and a generated magnetic field magnetizes a magnetic layer on the film. In the case of reproduction, leakage flux from the magnetic surface is picked up by the head core. Intensity of leakage flux generated from the surface is very low, so that the range of the magnetic flux is very narrow. Therefore, when a small spacing exists between the head and the magnetic surface due to an poor contact, the output level is greatly lowered and the signal can not be completely reproduced, which leads to a serious data error. Consequently, the intimate surface contact between film and head is very important. In the case of magnetic recording, a track is provided on the recording medium and signals are recorded on the track. Unless the reproduce head can precisely traces the track, the output level is also greatly lowered. Therefore, tracking is very important, too. Further, the medium is magnetized by the leakage flux from a gap of the recording head, and a gap of the reproduce head picks up the leakage flux from the medium. Therefore, an angle of the recording gap and that of the reproducing gap must be the same. Even when a offset between the head gap angles is about 1 degree, the outputs level is considerably lowered. This is referred to as an azimuth misalignment loss, and it is important to minimize the misalignment loss. In general, the conventional magnetic recording medium is filled with magnetic material at high density, because the output level depends largely on the packing density of the magnetic material. In the conventional magnetic recording apparatus, the transport speed and the track position of the medium must be strictly controlled. In summary, a good head contact, a precise tracking, a strict speed control and low azimuth loss, are the indispensable conditions for the conventional magnetic recording. On the other hand, the present application in which photographic information is directly recorded on a magnetic layer of a film is completely different from the conventional magnetic recording. For example, in the case of a photofinishing apparatus, we can not expect to control the transport speed and tracking position so strictly as the conventional magnetic recording apparatus. Further, in order to ensure the transparency of a film, an amount of magnetic material of the magnetic layer coated on the film is limited about $\frac{1}{50}$ to $\frac{1}{100}$ of a conventional magnetic recording medium, so that output signal level from the film becomes very low. In the case of a conventional magnetic recording medium such as a audio tape filled with a large amount of magnetic material, the output level is high enough, so it is less sensitive to head contact, tracking and azimuth loss. However, in the case of the present application, a transparent magnetic layer is employed, the output of which is about 1/50 to 1/100 as low as that of conventional magnetic medium. Therefore, the output signal level is largely affected by the head touch, tracking or azimuth misalignment. As described above, when signals are recorded on the transparent magnetic layer, it is very important to keep a good head touch, a precise tracking and a correct azimuth angle. However, the photographic film is stiffer, thicker and more curled than the conventional magnetic tape. Consequently, poor head touch, off tracking and azimuth misalignment tend to occur on the film easily. Further, the speed and tracking control of the photographic apparatus is much less sophisticated than that of a conventional magnetic recording apparatus. As described above, it is very difficult to record or reproduce information on the transparent magnetic layer of the photographic film.

A comparison between the conventional magnetic recording and the magnetic recording of the present application on the transparent magnetic layer provided on a film, will be made and problems caused during recording and reproducing will be explained as follows. In this case, the transparent magnetic layer is very thin (not more than 1 Jm, and preferably aroud 0.1 Jm), so that a ratio of the magnetic layer on the film is small. Accordingly, explanations will be made on the assumption that the physical properties of a film provided with the transparent magnetic layer are substantially the same as those of a conventional photographic film.

In general, a magnetic tape is made of a thin base film and a soft binder such as polyurethane so that the head and tape can easily keep good contact.

On the other hand, a photographic film is made of a base film, which is 5 to 10 times as thick as that of the magnetic tape, and a hard binder such as gelatin, so that a film cannot keep good contact with head. Therefore, a film is much stiffer than a magnetic tape and lacks the flexibility. Also, a film is composed of several of tens layers including a subbing layers, photosensitive layers and protective layer coated on the base film, so that the construction of the film is very complicated. Although an anti-curling layer is provided on the opposite side of emulsions, the layers become unbalanced during processing, and the film is considerably curled. Further, it tends to curl due to the variation of temperature and humidity. In this way, the film is curled in both the lateral and longitudinal directions. When the curls of these directions are combined, an irregular deformation is caused on the film surface.

As the transparent magnetic layer is coated all over the film surface, recording is possible on the entire surface. However, it is preferable that information is recorded in the non-image area on the film surface located in ranges within about 5 mm from the film edges. In the magnetic recording, the recording density is high, so that the information can be sufficiently recorded in these regions. In general, a photographic film curls in the lateral direction being formed concave while the emulsion layer surface is located inside of the curled surface. Especially, the edge portions are considerably curled. Therefore, it is difficult to obtain a good contact condition of the head in the curled edge portions.

What is called a magnetic film in which a thick magnetic layer is provided on a photographic base film, is used for recording sound in a motion picture. This film is also stiff and is difficult to obtain a good head contact, however, this film is used for sound recording only. Unlike the film of this invention, an amount of magnetic material to be used is not restricted. Therefore, an amount of magnetic material several times as much as that of the conventional magnetic tape is used so as to obtain an excellent S/N ratio. For this reason, a high output can be provided, so that the magnetic film is not so sensitive to a head touch, tracking and azimuth misalignment as the film of this invention.

As described above, it is very difficult to record or reproduce information on a film having a transparent magnetic layer compared with a case in which a conventional magnetic recording is conducted. According to the present invention, a new magnetic head supporting device is provided so as to solve the problems.

A magnetic head supporting device used for photographic films is disclosed in U.S. Pat. Nos. 5034836 and 5041933. According to the above patents, the magnetic head supporting device is constructed in the following manner: Two film guides to which the magnetic heads are attached, hold both edges of a film. An entire head unit is moved on an arc in accordance with the fluctuation of a film running angle, and several ball bearings are provided so that the heads can trace the irregular movement of the film edges. The above inventions solve the problems of tracking offset caused by the irregularity of the edge and variation of film width.

On the other hand, the present invention solves the problems caused by curling and deformation of the film. Further, the present invention solves the problems of defective edges, defective splice, change in the film angle, and irregularity of the reference edges. Furthermore, the present invention solves the problems of an film running, such as rolling and meandering. In the construction of the present invention, a number of leaf springs are combined, so that a transportation shock transmitted from the film can be effectively absorbed, which is unlike the construction in which a number of bearings are used.

A large number of problems which can not be solved by the conventional technique are encountered in the case of recording and reproducing on a film having a transparent magnetic layer. For example, the conventional magnetic recording technique in which a magnetic recording medium is pressed against a fixed head surface so as to obtain a good contact condition, is commonly used, however, in the case of a stiff and considerably curled film, the above technique can not be applied. If the film is strongly pressed against the fixed head surface, it is possible to keep a good contact between them. However, the signals are not stable and the film surface is easily damaged by the head. Since the transparent magnetic layer is coated all over the film surface, and recording is possible even in the image area, the damage of a film can be a fatal problem. Further, when the head is strongly pressed against the stiff, curled film, the head wears out quickly. A poor contact between the head and the film also causes various signal noises. Since the low output level signal must be amplified by an amplifier of high gain, the noises are also highly amplified, and the signal quality is largely deteriorated.

The present inventors have succeeded in obtaining a good and stable contact by using tiltably rotatable head support instead of fixed support. When the head and film are contacted, the film is deformed by the head and at the same time the head is tilted by the film. Therefore, the heads and film can quickly come into good contact with lower contact pressure, and the film surface can be prevented from being damaged and also the head surface can be prevented from wearing out. Since excessive head wear can be avoidable in this case, not only an expensive hard material difficult to be machined such as Sendust (Al—Fe—Si), but also an inexpensive soft material easy to be machined such as Hard Permalloy (Fe—Ni) can be applied for the head. However, the tiltably rotatable heads have some disadvantage. When the head angle is changed tracing the curls of the edge portions, partial off tracking may occur. However, when a head is tiltably rotated with a center at the track center, the head can trace the track without causing off-tracking.

In the magnetic recording on a film, film edges are used as a reference and tracks are provided at a position separated by a predetermined distance from the reference edges. In order to obtain interchangeability, the position and width of these tracks must be standardized. In the case where a magnetic trackrecorded by a camera is read out by a head of a photo-finishing machine, it is necessary that the tracks must be precisely traced by the head of the photographic printer. Since the photographic film is harder, thicker and more curled than the conventional magnetic tape, it is difficult to accurately slit the photographic film and the width of the film can fluctuate and edge irregularity can occur. So,the reference edges of the film tend to fluctuate. When the photographic films are processed, a large number of roll films are spliced so as to be formed into one big roll, and then the big roll is continuously processed. When the films are spliced with a splicer, the films can not be connected accurately, and a number of discrpancies can be caused. For this reason, the reference edges can be deviated after the splicing operation. Commonly, the width of the magnetic track is below 1 mm. When a discrepancy of 1 mm is caused between the films in a splicing portion, a head is completely deviated from a track. Unless the films are spliced linearly, the reference edges are gradually deviated. As described above, the slitting and splicing accuracy of a film are much lower than that of a magnetic tape. Consequently, the head supporting device must quickly follow the change in the reference edges position.

The film transport system of the photo-finishing apparatus is not sophisticated enough and the film is fed intermittently for each frame in the printer. Therefore, the film feeding speed is suddenly changed and the film is swayed laterally. Accordingly, poor head contact, off-tracking and azimuth misalignment tend to occur. For this reason, it is necessary for the head supporting device to be able to compensate this change in the film edge positions.

According to the present invention, the problems related to the tracking operation can be solved in the following manner: A film guides engaging with the reference edges of a film at all times are provided. A supporting member is integrated with this film guide and a head is attached to this supporting member.

Also, the film is held between one set of film guides. Even when the film angle or film position is changed due to edge irregurality, fluctuation of the film width, lateral sway of the film or defective splice, the entire head unit can compensate the fluctuation, so that an angle and position of the reproduce heads are maintained to be a predetermined value at all times, and the occurrence of an off-tracking and azimuth losses can be avoided.

When signals are recorded on a magnetic recording medium, it is necessary for the head to closely come into contact with the film surface. However, when the head is moved following the film, an angle formed between the head and film surface is changed, so that a spacing is formed between the head and film surface. As a result, the signal output is lowered, which causes an error.

The present invention relates to a magnetic head supporting device in which an angle formed between the surfaces of the head and film is always maintained zero even when the head position is moved. According to the magnetic head supporting device of the present invention, even when a positional relation between the film and head is greatly changed, the head can trace the movement of the film without forming any spacing between the head and film surface, and signals can be precisely transferred.

When the head is supported by a springs, there is a possibility that the head is vibrated by the action of friction. However, strong springs are utilized so as to prevent the vibration of the springs, wherein the springs are composed of a trapezoid spring and parallel spring which are combined, and these springs are activated so as to compensate each other. According to this head supporting construction, the head can trace the film surface smoothly and quickly. Also, these springs absorb a shock transmitted to the head from the film. Therefore, the sway of the head can be avoided, the output signal can be stabilized, and As a result, the reliability can be improved.

SUMMARY OF THE INVENTION

The aforementioned problems can be solved by a magnetic head supporting device for supporting a magnetic head which records or reproduces signals of information on a film having a transparent magnetic layer. This magnetic head supporting device comprises: first supporting arms including an adhesion portions for adhering the magnetic head, and the arm portion composed of two resilient members inclined from both ends of the adhesion portion, wherein the extensions of the two arms cross at the center of a gap of the magnetic head on the corresponding recording track. Alternatively, this magnetic head supporting device can include :holding members for holding the magnetic head, the holding members being attached on to both front and back side of the magnetic head in a running direction of the film; and shaft portion is provided in each of the holding members, wherein the magnetic head can be freely rotated aroud the shaft portion disposed in a direction perpendicular to the running direction of the film.

This magnetic head supporting device further comprises: first supporting members including a guide plate for guiding the magnetic head on to the film, and a second supporting arms perpendicular to the surface of the film. The second supporting arm being composed of two resilient members which are parallel with the running direction of the film. The second supporting arms are fixed to a second supporting members. This magnetic head supporting device is further characterized in that: the two sets of second supporting members to which the two magnetic heads are attached, are fixed to the third supporting members, wherein the third supporting members have the third arm composed of two inclined resilient arms, the extensions of which cross at the center of the film. This magnetic head supporting device further comprises: a fourth supporting member to which two third arms are attached, wherein the magnetic head supporting device is rotatably provided to a fourth arm composed of resilient members disposed in parallel with the film running direction at a position corresponding to the center of the film in the fourth supporting member.

DETAILED DESCRIPTION OF THE PREFERRED EMBODIMENT

With reference to the accompanying drawings, the present invention will be explained as follows.

Figure 1:
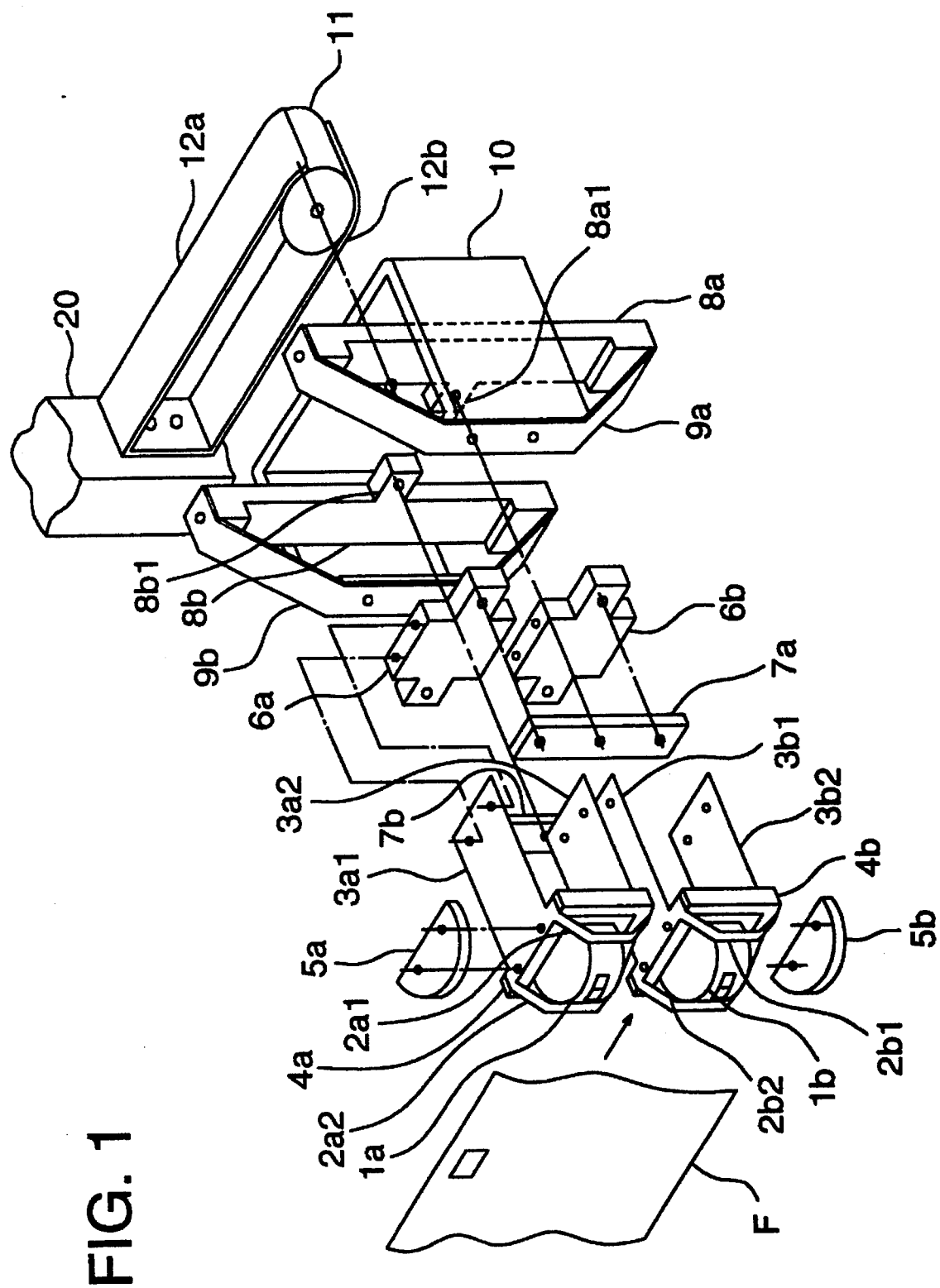
FIG. 1 is a perspective view showing an entire magnetic head supporting device which is an example of the present invention.
Figure 2:
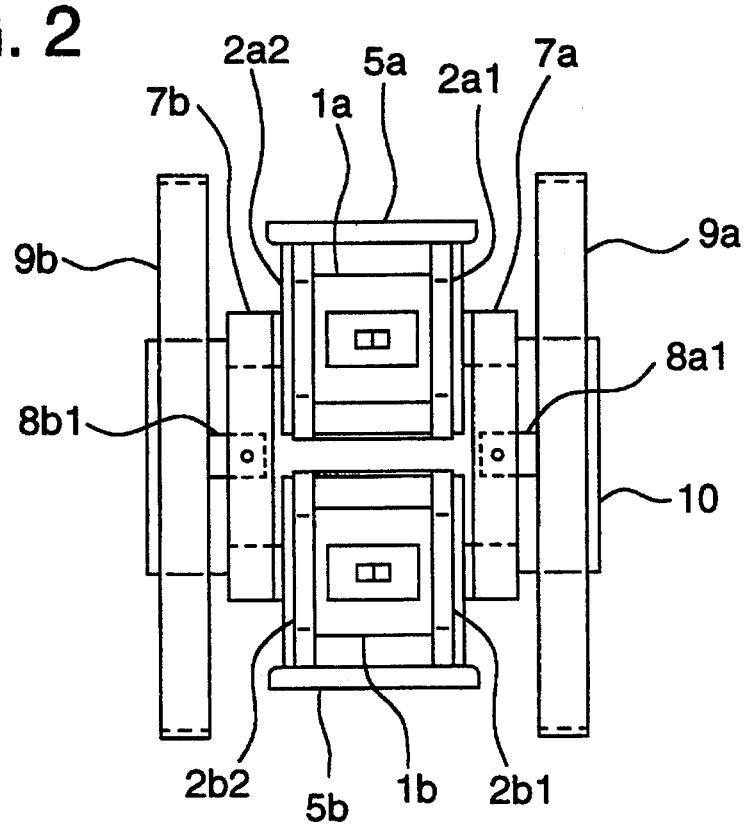
FIG. 2 is a front view of a magnetic head supporting device.
Figure 3:
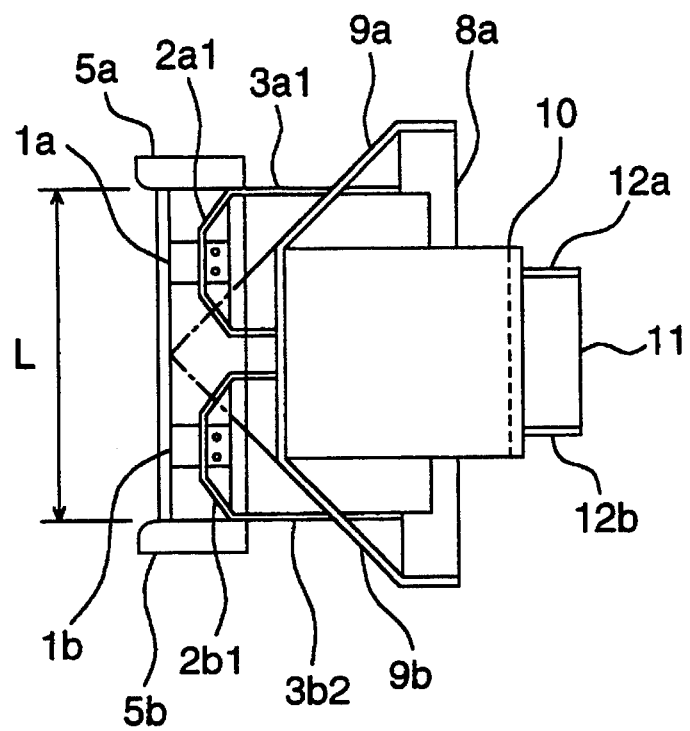
FIG. 3 is a side view of the magnetic head supporting device.
Figure 4:
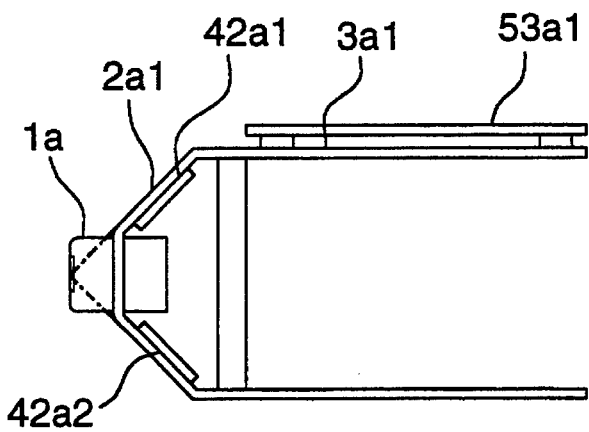
FIG. 4 is an enlarged side view of the first supporting arm.

FIG. 1 is a perspective view showing an entire magnetic head supporting device which is an example of the present invention. FIG. 2 is a front view of a magnetic head supporting device. FIG. 3 is a side view of the magnetic head supporting device. FIG. 4 is an enlarged side view of the first supporting arm. Numerals 1a, 1b are magnetic heads (referred to as a magnetic head, hereinafter). When a film F coated with a transparent magnetic layer all over the surface (this film F will be referred to as a film, hereinafter) is coveyed in a direction of arrow F, at least one of the magnetic recording operation and the reproduction operation is performed. Numeral 2a1, 2a2, 2b1, 2b2 are the first supporting arms composed of leaf springs formed into a trapezoid. A portion of the leaf spring corresponding to an upper side of the trapezoid holds the magnetic head 1a, 1b. An inclined arm portion is resilient. Numerals 3a1, 3a2, 3b1, 3b2 are the second supporting arms composed of two leaf springs for each head which are parallel with the film running direction, wherein the second supporting arms are perpendicular to the surface of the film F. Numerals 4a, 4b are the first supporting members which hold the ends of the first supporting arms 2a1, 2a2, 2b1, 2b2 and the ends of the second supporting arms 3a1, 3a2, 3b1, 3b2. In the drawing, the first supporting arms 2a1, 2a2, and the second supporting arms 3a1, 3a2, are integrated into one body, and the first supporting arms 2b1, 2b2, and the second supporting arms 3b1, 3b2, are also integrated into one body. However, they may be composed of different parts, and each of the parts may be attached to the first supporting members 4a, 4b. Numerals 5a, 5b are film guides, which are respectively fixed to the first supporting members 4a, 4b. Film F is interposed between the film guides so as to be positioned. Numerals 6a, 6b are the second supporting members which hold the other ends of the second supporting arms 3a1, 3a2, 3b1, 3b2. The second supporting members 6a, 6b are integrated into one body by connection plates 7a, 7b. When the holding method of the second supporting arms 3a1, 3a2, 3b1, 3b2 is changed, it is possible to form the second supporting members 6a, 6b and the connection plates 7a, 7b into one piece. Numerals 8a, 8b are the third supporting members, and the centers 8a1, 8b1 of the third supporting members 8a, 8b and the centers of the connection plates 7a, 7b are fixedly connected. Numerals 9a, 9b are the third supporting arms composed of leaf springs formed into a trapezoid. The inclined arms of the third supporting arms 9a, 9b are resilient, and the end portions of the arms are held by the third supporting members 8a, 8b. Numeral 10 is a C-shaped fourth supporting member, and its right and left end portions hold the portions of the third supporting arms 9a, 9b corresponding to the upper side of a trapezoid. Numeral 11 is a bearing, and the ends of the fourth supporting arms 12a, 12b composed of parallel leaf springs are fixed to the bearing 11. The bearing 11 is pivotally provided to a position corresponding to the center of the fifth supporting arms 12a, 12b. The other ends of the fifth supporting arms 12a, 12b are fixed to a fixing portion 20 for fixing the device.

Next, the operation of the magnetic head supporting device of this example will be explained as follows.

As illustrated in FIG. 4, the imaginary lines which are colinear with and extend from first supporting arms 2a1, 2a2, 2b1, and 2b2 cross each other at an imaginary line which is colinear with and extends from a magnetic gap of the tracking section of the magnetic head. Therefore, even if a head angle is tilted when the head traces a film curl in the case where the film is curled in a direction perpendicular to the film running direction, the occurrence of off-tracking can be avoided, because the tilting rotation is centered at the center of tracks. Accordingly, even in the film edges where the film is considerably curled, the head and film come into good contact with low contact pressure. In this connection, when a wide leaf spring is employed, the rigidity of the supporting arm of the leaf springs can be increased with respect to the film running direction. Therefore, vibration of the springs by friction can effectivly be prevented, and reproduced signals can be stabilized.

The film guides 5a, 5b are fixed to the first supporting members 4a, 4b in such a manner that the distance (L shown in FIG. 3) between the film guides 5a, 5b is about 1 mm shorter than the film width. The first supporting members 4a, 4b are provided with the second supporting arms 3a1, 3a2, 3b1, 3b2 which are parallel leaf springs. Accordingly, the film guides 5a, 5b are engaged with both edges of the film at all times so that the film guides 5a, 5b can trace the film edges. At the same time, the film guides 5a, 5b deform the second supporting arms 3a1, 3a2, 3b1, 3b2 in accordance with the force given by the film. The second supporting arms 3a1, 3a2, 3b1, 3b2 are deformed while they are always maintained parallel. Consequently, the head 1a, 1b are also moved in parallel with the film surface, so that a relative angle formed between the film and head surfaces is always kept zero, and no spacing exists. As described above, the magnetic head supporting device of the present invention has a tracking function by which the head can accurately trace a track disposed at a position separated by a predetermined distance from the reference film edge, and also has a surface angle holding function by which the relative surface angle between the film and head can be maintained zero even when the magnetic head is moved tracing the film surface.

As illustrated in FIG. 3, the third resilient supporting arms 9a, 9b are constructed in such a manner that the extensions of the arms cross at the center of the film. The third supporting members 8a, 8b to which the third supporting arms 9a, 9b are attached are fixedly provided to the connection plates 7a, 7b. Accordingly, even when the film is inclined to the width direction, the film and head surfaces come into contact at all times, so that the head can accurately trace the track. Whereas the film running accuracy of a photo finishing apparatus is low and the number of guides is small and further films are irregularly curled, the film is laterally inclined while running, however, the magnetic head can precisely and closely trace the film surface at all times.

The fourth supporting member 10 to which the third supporting members 8a, 8b are attached is rotatably provided through the bearing 11. Therefore, the head supporting device located in the front of the fourth supporting member 10 can be smoothly rotated with respect to the sway of the film in the longitudinal direction. Since the bearing 11 is fixed to the fourth supporting arms 12a, 12b which are provided in parallel with the film running direction, the relative surface angle between the head and film surfaces is always kept zero even when the entire head supporting device in the front of the fourth supporting member 10 is moved in the film width direction. In the photographic printer, films are transported for each frame so as to be exposed intermittently. Accordingly, recording and reproducing operations are also intermittently performed on a transparent magnetic layer. Further, the length of one frame is short, that is the length of one frame is only about 38 mm for the conventional film. Therefore, the film is repeatedly, frequently conveyed and stopped. For this reason, the film is laterally deviated withrespect to the running direction, however, the head and film can be closely contacted as explained above.

Figure 5:
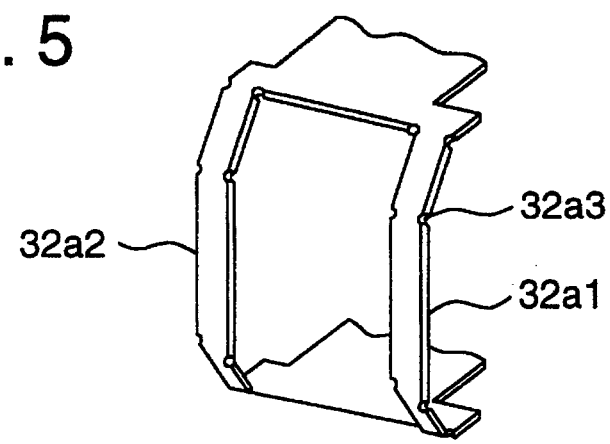
FIG. 5 is a view showing another example of the first supporting arm shown in FIG. 1.

FIG. 5 is a view showing another example of the first supporting arm illustrated in FIG. 1. In the bent portions of the first supporting arms 32a1, 32a2, cut-out portions 32a3 are formed. Consequently, rigidity of the rotational resilient force of the arm can be reduced without deteriorating the supporting strength of the leaf spring. Therefore, the head can quickly trace the surface of a curled film.

In FIG. 4, numerals 42a1, 42a2 are reinforcement members provided to the arm portion, wherein the entire thickness of the first supporting arms 2a1, 2a2, 2b1, 2b2 is reduced to be softer spring arms. In this case, the reinforcement members 42a1, 42a2 are not provided in the proximity of the fulcrum of the arm portion. Accordingly, the head can be easily rotated for film width direction with tighter support for a film running direction.

In FIG. 4, numeral 53a1 is a reinforcement plate attached to the second supporting arm 3a1 disposed outside. Since 3 pieces of leaf springs are provided, the force to hold the film is increased. Therefore, even when the film width and position fluctuate greatly, the head can accurately trace the film surface, increasing interposing force of the film.

Figure 6:
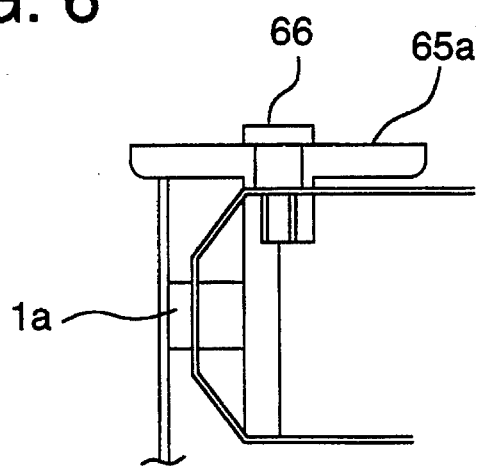
FIG. 6 ms a view showing another example of a film guide shown in FIG. 1.

In FIG. 6, numeral 65a is a film guide of another example of the film guide 5a illustrated in FIG. 1. Since the film guide 65a is pivotally provided to the shaft 66, the film guide 65a is rotatble, and may have long time durability for wearing, it little wears out when it comes into contact with the film edge.

Figure 7:
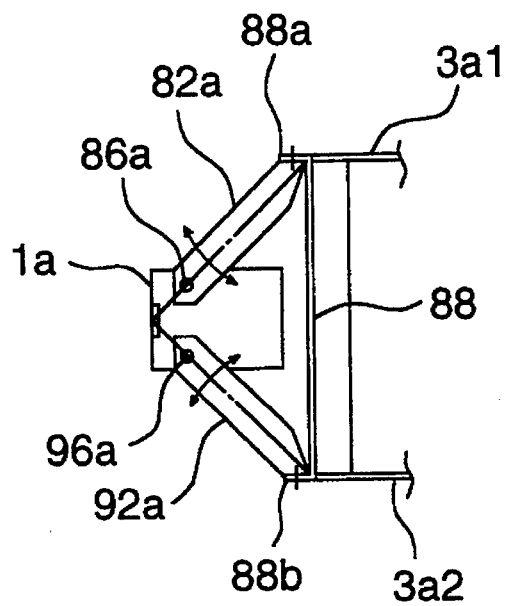
FIG. 7 is a side view showing another example of the first supporting arm shown in FIG. 8.
Figure 8:
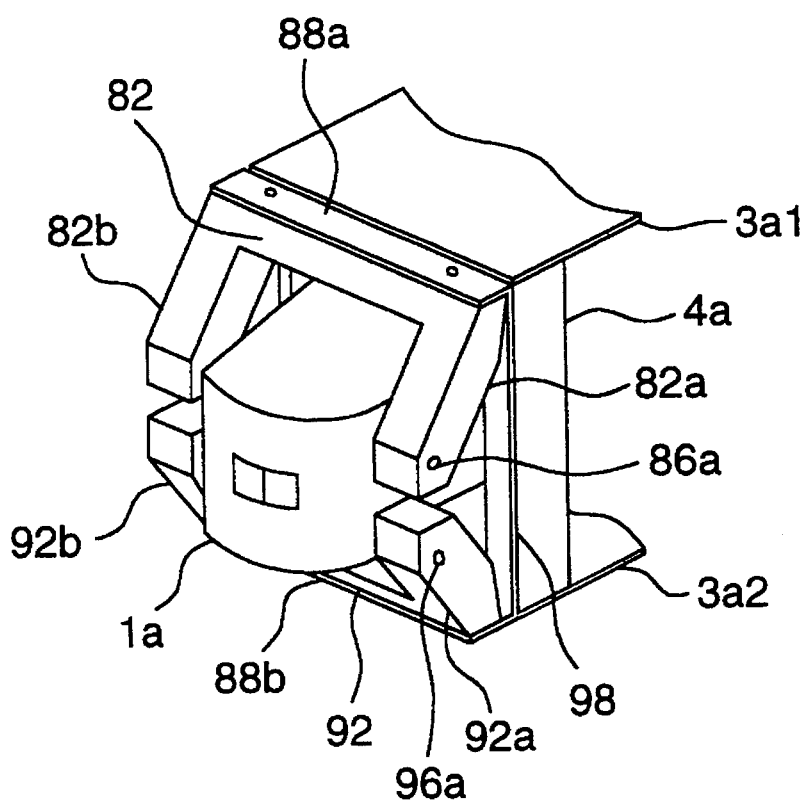
FIG. 8 is a perspective view of an example shown in FIG. 7.

FIG. 7 and FIG. 8 show another example of the first supporting arm illustrated in FIG. 1. FIG. 7 is a right side view. FIG. 8 is a perspective view. In this case, the head 1a and the second supporting arms 3a1, 3a2 are the same as those of the example shown in FIG. 1. Numerals 82a, 82b, 92a, 92b are the first supporting arms and provided on the front and back side of the head 1a. On the right side of the head 1a, the head 1a is rotatably supported by the first supporting arms 82a, 92a. On the left side of the head 1a, the head 1a is rotatably supported by the first supporting arms 82b, 92b. However, the end of the first supporting arm 82a and that of the first supporting arm 82b are integrally connected, so that they form the first supporting arm 82. In the same manner, the end of the first supporting arm 92a and that of the first supporting arm 92b are integrally connected, so that they form the first supporting arm 92. Numeral 88 is a leaf spring, and rising portions 88a, 88b are provided in the vertical direction of the head, so that the leaf spring 88 is fixed to the first supporting arms 82, 92. Consequently, the leaf spring 88 functions as the fulcrums for the first supporting arms 82, 92 for the other ends. A straight line connecting the shaft 86a with the bent portion of the spring 88 and a straight line connecting the shaft 86c with the bent portion of the leaf spring 88 cross at the center of the track of the head. Accordingly, in the case where the film curls in a direction perpendicular to the running direction, the magnetic head 1a is moved when the first supporting arms 82a, 82b and the first supporting arms 92a, 92b on the other side are rotated. In this way, the head can trace the curled film wherein the magnetic head gap becomes the center of the rotation. As a result, evev when the head angle is tilted, the occurrence of off-tracking can be avoided.

Figure 9:
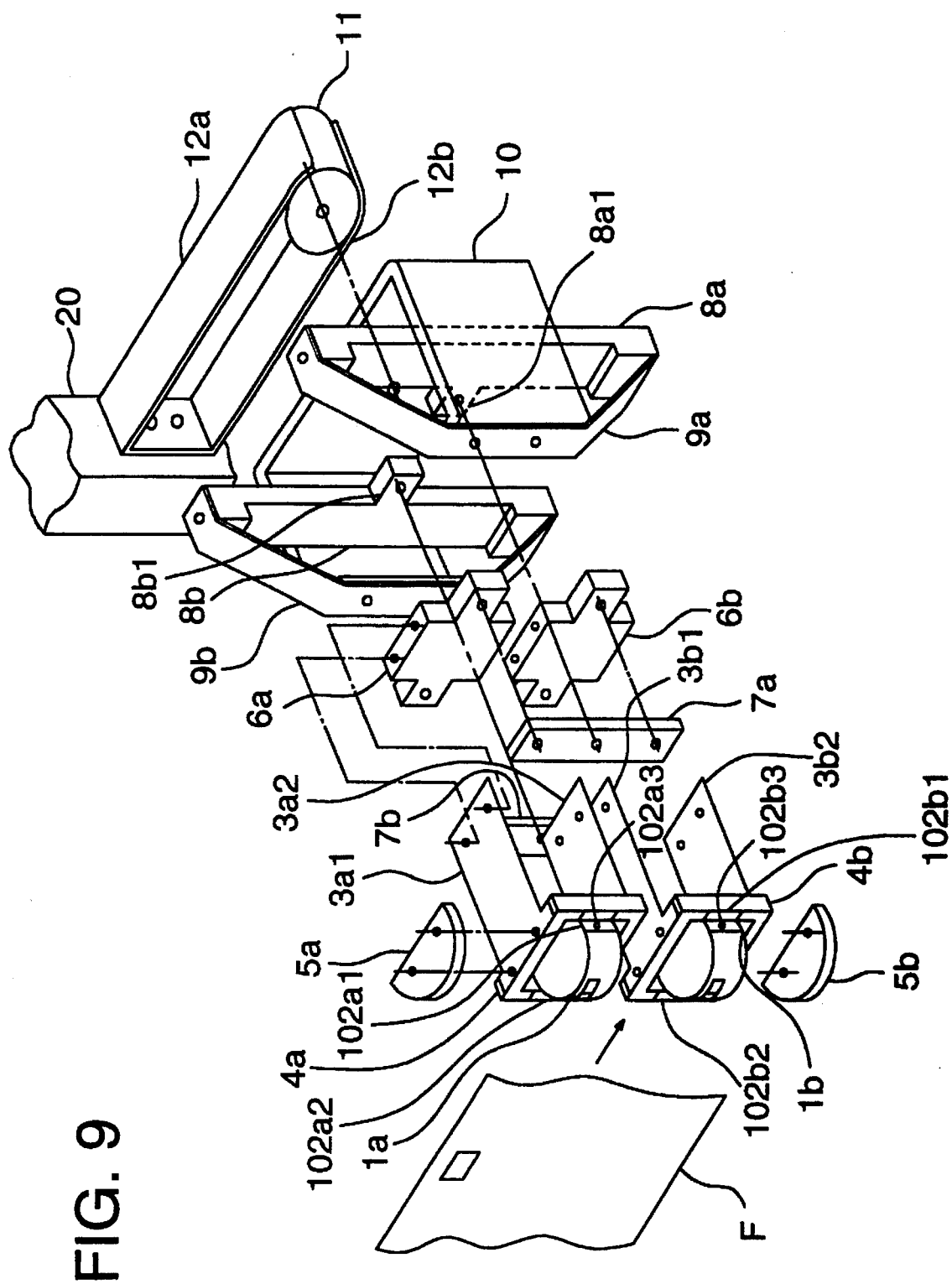
FIG. 9 is a perspective view showing an entire magnetic heads supporting device which is another example of the invention.
Figure 10:
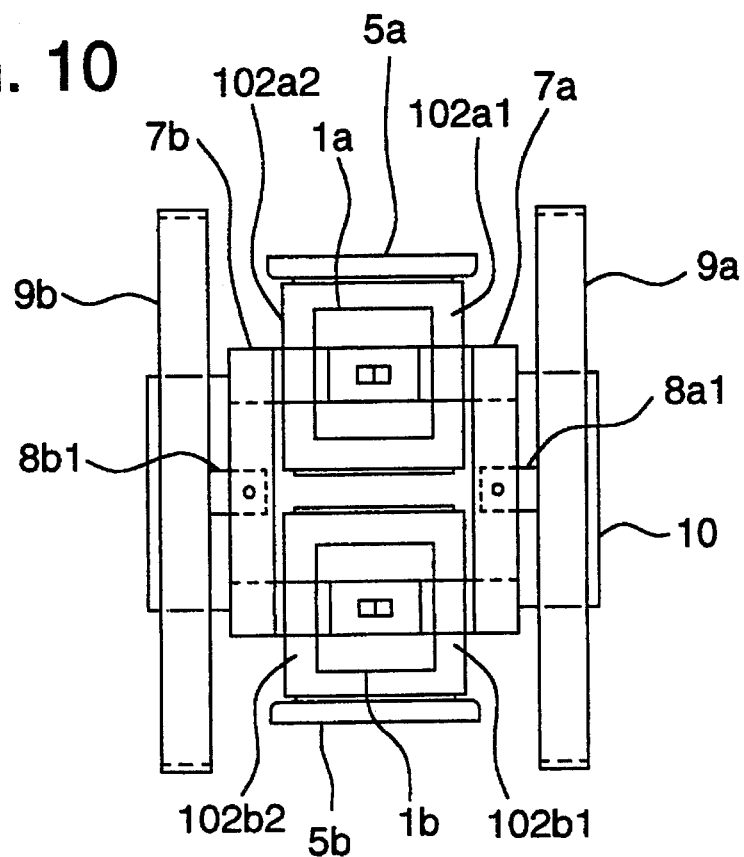
FIG. 10 is a front view of the device of FIG. 9.
Figure 11:
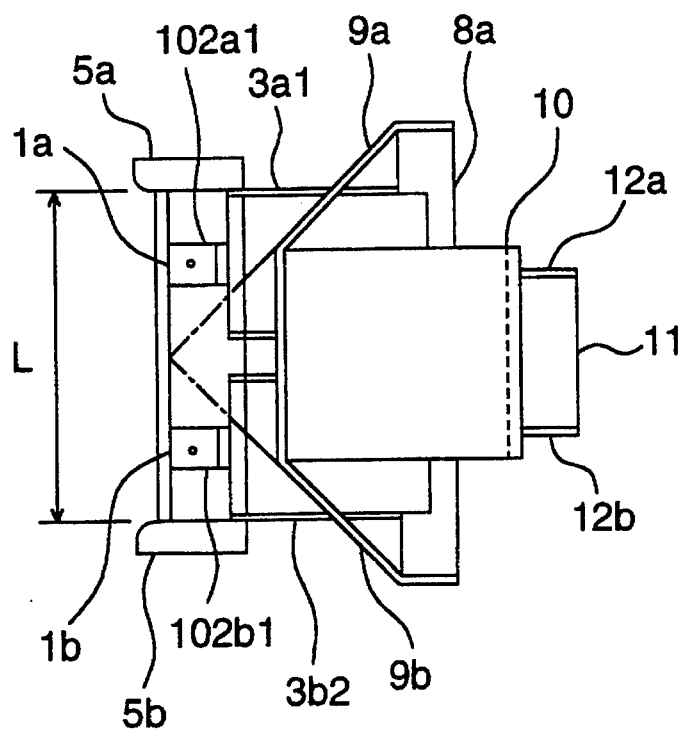
FIG. 11 is a side view of the device of FIG. 9.

FIG. 9 is a perspective view showing the entire magnetic head supporting device composing another example. FIG. 10 is a front view FIG. 11 is a side view. Numerals 102a1, 102a2, 102b1, 102b2 are holding members composed of metal plates to hold the heads at both sides. The heads 1a, 1b are rotatably supported in a direction perpendicular to the film running direction by the shafts 102a3, (102a2), 102b3, (102b2).

In this example, the holding members 102a1, 102a2, 102b1, 102b2 rotatably support the heads so that the heads can be rotated in the film width direction. Accordingly, the head angle is tilted by tracing a curled film, the head surface can be positively contacted with the film surface. When the head angle is greatly tilted, the track position is changed and off-tracking occurs. However, when a film transport is constructed that the film is passed around the cylindrical head surface, an amount of curl in the direction perpendicular to the film running direction can be reduced. Therefore, if a track has the width of 1 to 2 mm, a serious off-tracking such as losing a data is not caused in the practical use.

As explained above, in the magnetic head supporting device of the present invention, the construction is simple and the cost is low, and further the following effects can be provided.

(1) The head can trace the surface of a film, both edges of which are curled, while the head gap does not deviate from the track. That is, the magnetic head supporting device has a curl tracing function.

(2) The head can precisely trace the fluctuation of film edges, so that the head accurately trace the track on the film. That is, the magnetic head supporting device has a tracking function.

(3) The magnetic head supporting device has an azimuth misalignment loss prevention function by which an angle formed between the film reference edge and the head gap can be maintained constant.

(4) The magnetic head supporting device has a surface tracing function by which the head can follow a change in the film position while a relative angle formed between the head surface and the film surface is maintained zero, and always no spacing exists.

(5) The magnetic head can precisely trace the surface of a curled film. Therefore, even when the head loading force is lowered, the head comes into contact with the film surface in a good condition. As a result, the film is not damaged, and the head little wears out.

(6) The signal output is high with less fluctuation. Therefore, even when the film is not transported smoothly, the head is moved following to the film surface with good contact. Accordingly, the head can quickly settle following the movement of the film, and signals can be correctly transferred without defect.

What is claimed is:

1. An apparatus for recording or reproducing information on a magnetic layer provided on a photographic film, comprising:

a transport to convey the film along a predetermined passage;

a magnetic head to record or reproduce the information on the magnetic layer, the magnetic head having a tracking section on its one surface;

a first base member; and two first supporting arms, fixed on the first base member, to support the magnetic head in close proximity to the passage so that the tracking section of the magnetic head is brought in contact with the film, wherein the two first supporting arms and the magnetic head are aligned along the passage, and the magnetic head is provided between the first supporting arms, each of the first supporting arms includes two arm portions, one end of the arm portions being fixed to the first base member in such a manner that the two arm portions are inclined to the first base member and imaginary lines which are colinear with and extended from the two arm portions cross each other at an imaginary line which is colinear with and extended from the tracking section of the magnetic head.

2. The apparatus of claim 1 wherein each of the two first supporting arms has a bent portion on which a cut-out portion is provided.

3. The apparatus of claim 1 wherein the two arm portions of the first supporting arms are provided with a reinforcement member.

4. The apparatus of claim 1 further comprising:

a second base member; and two second supporting arms, fixed on the second base member, to support the first base member so that the tracking section of the magnetic head is brought in contact with the film, wherein the second supporting arms and the first base member are aligned parallel to the film width direction, and the first base member is provided between the second supporting arms.

5. The apparatus of claim 4, further comprising:

a third base member; and two third supporting arms, fixed on the third base member, to support the second base member so that the tracking section of the magnetic head is brought in contact with the film, wherein the third supporting arms and the second base member are aligned along the passage, and the second base member is provided between the third supporting arms, each of the third supporting arms includes two arm portions, one end of the arm portions fixed to the third base member in such a manner that the two arm portions are inclined to the third base member and imaginary lines which are colinear with and extended from the two arm portions cross each other at the center portion of the film.

6. The apparatus of claim 4, further comprising:

a guide plate attached to the first base member to guide the film running the passage so as to guide one side edge of the film.

7. The apparatus of claim 4, wherein the guide plate is provided on the first base member so as to rotate in parallel to the passage.

8. An apparatus for recording or reproducing information on a magnetic layer provided on a photographic film, comprising:

a transport to convey the film along a predetermined passage;

a magnetic head to record or reproduce the information on the magnetic layer, the magnetic head having a tracking section on its one surface;

a first base member for supporting the magnetic head;

a third base member; and two third supporting arms, fixed on the third base member, to support the first base member so that the tracking section of the magnetic head is brought in contact with the film, wherein the two third supporting arms and the magnetic head are aligned along the passage, and the magnetic head is provided between the third supporting arms, each of the third supporting arms includes two arm portions, one end of the arm portions fixed to the third base member in such a manner that the two arm portions are inclined to the third base member and imaginary lines which are colinear with and extended from the two arm portions cross each other at the center portion of the film.

9. An apparatus for recording or reproducing information on a magnetic layer provided on a photographic film, comprising:

a transport to convey the film along a predetermined passage;

a magnetic head to record or reproduce the information on the magnetic layer, the magnetic head having a track section on its one surface;

a first base member; and two first supporters, fixed on the first base member, to support the magnetic head in close proximity to the passage so that the track section of the magnetic head is brought in contact with the film, wherein the two first supporters and the magnetic head are aligned along the passage, the magnetic head is provided between the first supporters, each of the first supporters includes a holding member provided on the first base member so that the magnetic head is held between the holding members of the first supporters, and a shaft supporting the head to rotate in a direction parallel to the film width direction.

10. An apparatus for recording or reproducing information on a magnetic layer provided on a photographic film, comprising:

a transport to convey the film along a predetermined passage;

a magnetic head to record or reproduce the information on the magnetic layer, the magnetic head having a tracking section on its one surface;

a first base member; and two first supporters, fixed on the first base member, to support the magnetic head in close proximity to the passage so that the tracking section of the magnetic head is brought in contact with the film, wherein the two first supporters and the magnetic head are aligned along the passage, and the magnetic head is provided between the first supporters, each of the first supporters includes a spring plate having a bent portion, provided on the first base member; and a set of arms, at one end of which the arms are rotatably connected with both upstream and downstream sides of the magnetic head so that the magnetic head is rotatable in the direction parallel to the film width direction and at the other end of which the arms are connected with the bent portion of the spring plate, wherein the distance between the arms at the other end is larger than that at the one end.

11. The apparatus of claim 10, wherein imaginary lines, extending through points where said one ends of said set of arms are rotatably connected with said head and points where said other ends of said set of arms are connected with said bent portion, cross each other at an imaginary line colinear with and extending from the tracking section of the magnetic head.

* * * * *